June 3, 1941.                    J. M. TWEIT                    2,244,585
                          SUPPLEMENTARY HANDLE
                           Filed Dec. 19, 1939
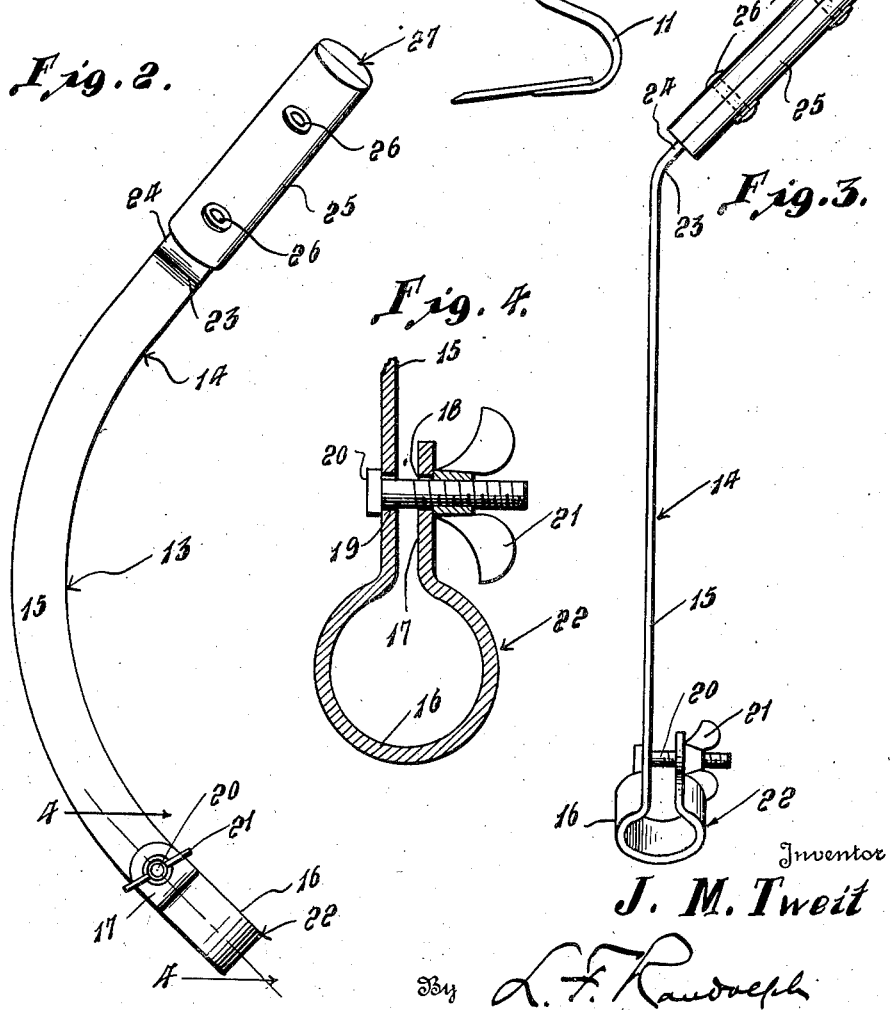
Inventor
J. M. Tweit
By L. F. Randolph
Attorney Patented June 3, 1941

2,244,585

UNITED STATES PATENT OFFICE 2,244,585

SUPPLEMENTARY HANDLE

Jacob M. Tweit, Holcombe, Wis.

Application December 19, 1939, Serial No. 310,089

4 Claims. (Cl. 97—71.1)

This invention relates to a detachable and adjustable supplementary handle for use in conjunction with the handles of hoes, rakes, brushes, brooms, mops and the like which are operated from a standing position.

More particularly, it is an aim of this invention to provide a supplementary handle which will enable the operator to stand comfortably in an upright position while operating said tools or implements and to eliminate the strain ordinarily resulting from leaning forward in order to grasp the tool handle with both hands.

More particularly, it is an aim of this invention to provide a supplementary handle which is adjustably and removably attached to a tool or implement handle and which is disposed thereabove and at a sufficient distance from the free end of the tool or implement handle to provide the leverage required to effectively operate the tool or implement yet which is disposed at an elevation so that both hands of the operator will be at substantially the same height thereby eliminating the necessity of leaning forward when working with the tool or implement.

Other objects and advantages of the invention will hereinafter become more fully apparent from the following description of the drawing, which illustrates a preferred embodiment thereof, and wherein—

Figure 1 is a side elevational view showing the invention attached to the handle of a hoe, Figure 2 is an enlarged side elevational view of the attachment from the opposite side thereof, Figure 3 is a front elevational view of the same, and Figure 4 is an enlarged longitudinal sectional view taken substantially along the plane of the line 4—4 of Figure 2.

Referring more particularly to the drawing, wherein like reference characters designate like or corresponding parts throughout the different views, 10 designates generally a hoe comprising a head 11 and a handle 12. This implement or tool is illustrated and described merely to illustrate the application of the invention, designated generally 13, and it is to be understood that the attachment 13 is adapted to be employed with handles of all types of tools and implements which are used similarly to a hoe, that is where the operator stands while working the tool or implement and where the handle is disposed at an angle of substantially forty-five degrees to the horizontal, such as rakes, mops, brushes, brooms and the like.

The invention, designated generally 13, comprises an attachment adapted to be used on the handle 12 and comprises a shank, designated generally 14, having an arcuately shaped end 15, the terminal of which is bent to form the loop 16 which is adapted to slidably engage the handle 12. The terminal 17 of the loop 16, as best seen in Figure 4, is provided with an opening 18 to aline with an opening 19 in the portion 15 to receive a bolt 20 provided with a wing nut 21. The terminal 17 is disposed in spaced substantially parallel relationship to the contiguous portion of the arcuately shaped end 15 so that by tightening the wing nut 21 the loop 16 will be drawn into clamping engagement with the handle 12. It will thus be seen that the loop 16 combines with the bolt and nut 20 and 21 to form a clamp, designated generally 22 by means of which the attachment 13 may be adjustably secured to the handle 12.

At the opposite end of the arcuately shaped portion 15, the shank 14 is bent at the point 23 so that its opposite end 24 is disposed at an oblique angle to the portion 15. The handle portion or grip 25 is secured to the oblique portion 24 by means of the fastenings 26 to form the supplementary handle 27.

Supplementary handle 27 therefore is disposed at an oblique angle to the arcuately shaped portion 15, as best illustrated in Figure 3.

From the foregoing it will be obvious that the attachment 13 may be detachably connected to the handle 12 and adjustably positioned relatively thereto, as illustrated in Figure 1, so that the arcuately shaped portion of the shank 14 will project upwardly from the handle 12 through an arc extending toward the free end thereof and is adapted to be disposed substantially in the same vertical plane as the handle of the implement 10. The supplementary handle 27 will therefore be disposed at an oblique angle to the handle 12, and as best seen in Figure 1, handle 27 is at substantially the same height as the free end of the handle 12 when the implement 10 is disposed at substantially an angle of forty-five degrees from the horizontal or in its normal position for use. The operator grasps the free end of the handle 12 with the right hand and standing alongside of said end grips the supplementary handle 27 with the left hand so that both hands will be disposed at substantially the same height for operating the implement 10 thereby enabling the implement to be used without the operator leaning forward while at the same time the two hands of the operator are spaced apart a sufficient distance so that proper leverage is obtained. Supplementary handle 27 is disposed, in Figure 1, to project toward the operator when the free end of the handle 12 is grasped in the right hand and held to the right of the operator. Obviously, the supplementary handle 27 could be arranged to project obliquely in the opposite direction for the use of a left handed operator as the attachment 13 is designed and adapted for use by a right handed person.

Various modifications and changes are contemplated and may obviously be resorted to without departing from the spirit and scope of the invention as hereinafter defined by the appended claims.

I claim as my invention:

1. An attachment for tools of the type having long handles, comprising an elongated shank having an arcuately shaped portion, said portion terminating in a clamp for engaging the tool handle whereby said attachment may be adjustably positioned relatively thereto, said arcuately shaped portion extending upwardly from the tool handle and toward the free end thereof, and the opposite end of said shank being bent to project obliquely relatively to said arcuately shaped portion and to the vertical plane of the tool handle to form a secondary handle.

2. An attachment for tools having elongated handles such as hoes and rakes, comprising an elongated arcuately shaped shank having one end secured to an elongated handle of a tool, in spaced apart relationship to the upper and lower ends of the handle and projecting upwardly therefrom and toward the upper, free end of the tool handle, and said shank having a handle portion at its free end, said handle portion being disposed at an oblique angle to the shank and to the vertical plane of the tool handle and being spaced from and disposed to one side of the free end of the tool handle.

3. An attachment for elongated handles of rakes, hoes and the like, comprising an elongated shank having a clamp formed integral with one end thereof for adjustably engaging a tool handle in spaced apart relationship to the ends of the handle, a portion of said shank, adjacent said clamp, being arcuately shaped and being disposed in a plane with and above the tool handle, said handle having a secured end and a free end, and said shank having its opposite, free end disposed obliquely to said arcuately shaped portion and to the tool handle, the free end of the shank being disposed above and to one side of the tool handle and in close proximity to the free end of the handle to form a supplementary handle.

4. A supplementary handle for tools comprising an arm having an arcuately shaped portion terminating in a clamp for adjustably positioning said supplementary handle on an elongated tool handle, said tool handle having a secured end and a free end, said arm extending from the clamp upwardly from the tool handle and toward the free end of the tool handle, and the opposite end of said arm being disposed obliquely to the arcuately shaped portion and forming a supplementary handle portion, said supplementary handle portion being disposed to one side of and obliquely to the free end of the tool handle and at substantially the same elevation as the tool handle when the latter is disposed in a working position.

JACOB M. TWEIT.